March 13, 1934.  O. P. BAILER  1,950,647
MECHANICAL TIME MOVEMENT
Filed Feb. 27, 1932
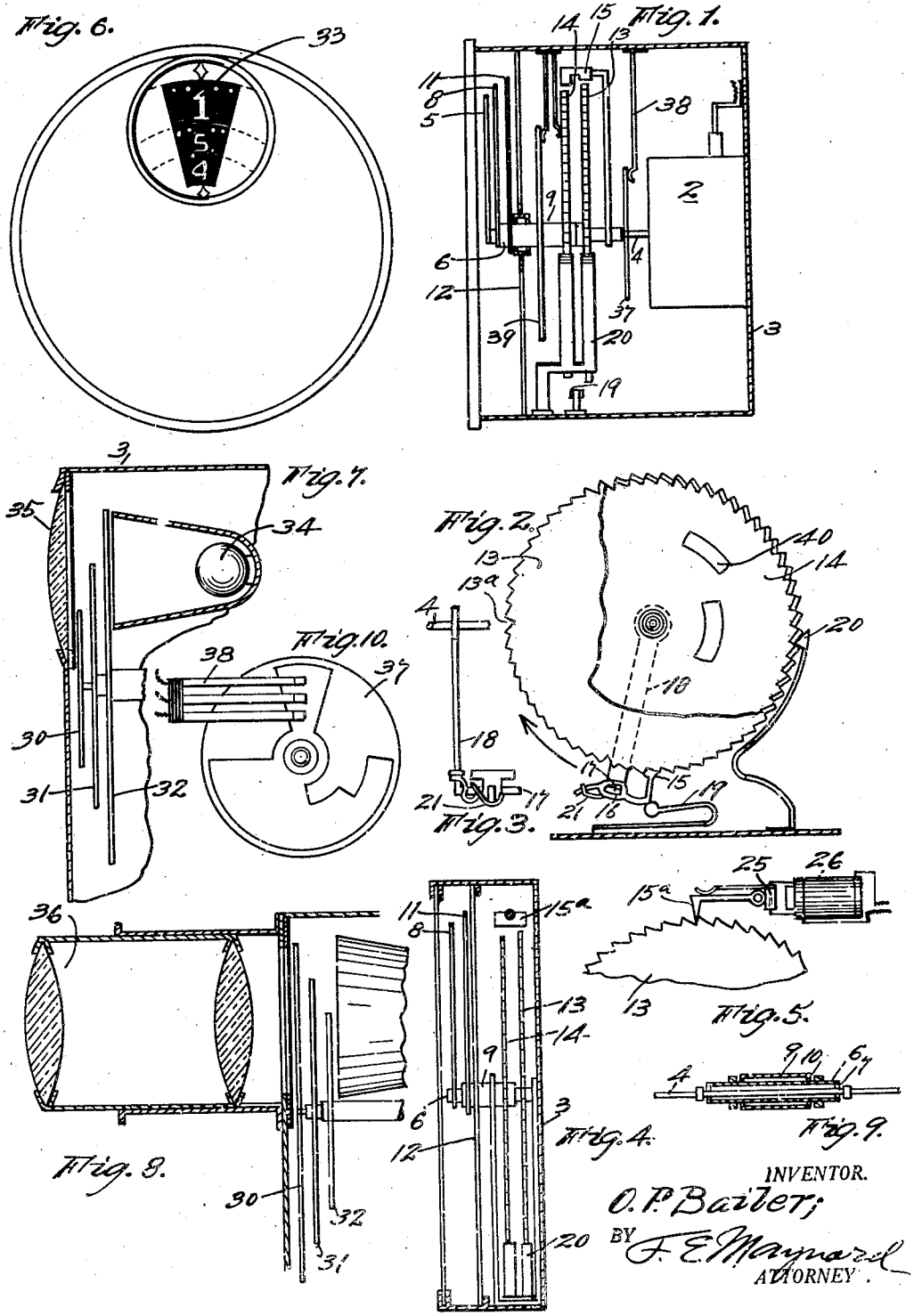
INVENTOR.
O. P. Bailer;
BY F. E. Maynard
ATTORNEY.

Patented Mar. 13, 1934

1,950,647

UNITED STATES PATENT OFFICE 1,950,647

MECHANICAL TIME MOVEMENT

Otto P. Bailer, Santa Monica, Calif.

Application February 27, 1932, Serial No. 595,556

2 Claims. (Cl. 58—125)

This invention relates to mechanical, time means, and more especially to electrically motivated clocks.

It is a broad object of the present invention to provide an electric clock whereby power is transmitted from an electric motor to a set of movable indicators which may comprise either conventional pointing hands operating over a fixed dial, or may comprise a coordinated set of dials including translucent or transparent indicating symbols, by means which eliminate a reduction gear train. In other words, it is an object to provide a simplified transmission for connecting the driving motor to the indicating means, whatever their character may be.

A further object is to provide an electric clock apparatus wherein transmitting means may be operated by synchronized electrical impulses of a given rate per minute, or at an impulse for each second, or may be operated on impulses at the rate of one per minute, as will be explained more in detail hereinafter.

More definitely, it is an object to provide an electric clock movement incorporating a set of ratchet wheels of a predetermined ratio and so coordinated that one of the wheels is given an impulse at a predetermined rate of one to a suitable number of impulses on the companion wheel. In other words, it is an object to transmit power through a system of coordinated transmitting ratchet wheels to a relative system of movable indicators either in the form of pointers or rotating dials, means being incorporated whereby one of the ratchet wheels is moved intermittently at a predetermined rate per minute or hour, and the companion ratchet wheel is operated at a much reduced intermittent rate of advance as to the first named ratchet wheel.

An object is to provide variant forms of prime movers for the coordinated transmitting ratchets and in one case, it is an object to provide for motivation of the master ratchets by means driven either continuously or in impulses of a desired rate per minute to effect the desired rate of advance of the master ratchets, while in the other case, it is an object to provide means directly operative on the master ratchets and motivated by predetermined, timed, electrical impulses, thus eliminating an intermediate transmitting mechanism as is involved in the first case. An advantage of the direct action means of the second case, just mentioned, is that the clock can be operated on impulses at the rate of one per minute and therefore very considerably reduce the cost of power consumed in operation of the clock.

A further object is to provide an electric clock in which there is combined with the indicating means a system of circuit making or breaking apparatuses for the control of various circuits including desired electrically controlled units of which many kinds may be employed in combination with the present clock.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a diametrical section through a form of the clock.

Figure 2 is a detail elevational view of the master ratchet wheels and their control means; one of the wheels being broken away.

Figure 3 is a detail of the ratchet pawl arm.

Figure 4 is a diametrical section of a modified form of the clock utilizing a direct armature-pawl action.

Figure 5 is a side elevation of the armature pawl and a fragment of a relative ratchet wheel.

Figure 6 is a face elevation of the clock showing a disc indicator system.

Figure 7 is a sectional view of the clock of Figure 6 showing indicator illuminating means.

Figure 8 is a detail sectional view of a disc indicator system in a beam projecting clock.

Figure 9 is an axial section showing a special cannon mounted on a pinion and showing a special arbor mounted on the cannon.

Figure 10 is a detail of a circuit contact disc.

In its illustrated embodiment in the form of clock shown in Figures 1, 2 and 3, a clock motor 2, arranged in a casing 3, drives a shaft 4, carrying a second finger or pointer 5, making a complete revolution in one minute, and either by continuous action or in periodical impulses according to the character of the prime motor 2. Loosely mounted on the shaft 4 is a minute cannon 6, which as shown in Figure 9 is hollow and has its ends inturned at 7 to form reduced friction bearings on the spindle 4. Fixed on the minute cannon 6 is a minute pointer 8, and turnably mounted on the cannon 6 is a hollow hour arbor 9 having inturned end bearings 10 to reduce friction of operation.

The arbor 9 is provided with an hour hand 11. The hands 5—8—11 are disposed in front of a fixed index dial 12 in the casing 3, and which may be utilized as a bearing for the hour arbor 9.

An important feature of the present invention resides in a gearless means for transmitting motion from the motor shaft 4 to the minute and hour hands 8 and 11, and in Figs. 1, 2 and 3, the transmitting means consists of a pair of ratchet wheels 13 and 14, each of which has an equal number, for instance sixty, peripheral teeth; the wheel 14 being slightly smaller in diameter than the wheel 13, and the latter has its teeth spaced in groups of similar numbers, for instance twelve, of teeth and each group is divided by a deep root 13a, for a purpose later described.

The larger wheel 13 is fixed on the minute cannon and the smaller gear 14 is fixed on the hour cannon, and they are situated relatively close so that both may be actuated in predetermined steps by means of a common pawl 15 having a nose operative and complementary to the teeth of the ratchet wheels and these are preferably of an angular form so that when the complementary actuating nose of the pawl 15 becomes engaged with the teeth of the ratchet wheels these are automatically precisioned as to position so as to maintain accuracy of action in time indicating sequence.

The pawl 15 has an eye 16 adapted for limited oscillation on a horn 17 bent laterally from a pawl arm 18 which is fixed on the motor shaft 4, which, as before stated, carries the second hand 5 which make one complete revolution per minute, either by continuous motor effect or intermittent impulse action. Therefore, the pawl arm 18 makes a complete revolution per minute and it is desirable to effect the engagement of the pawl 15 with the minute hand operating ratchet wheel 13 once during each revolution of the driving shaft 4.

To that end, means are provided whereby to throw the pawl 15 into effective driving engagement with the ratchet wheel 13 at minute intervals. As shown in Fig. 2, this means includes a kick-in spring 19 whose free end is normally disposed in the orbit of the pawl 15 so that the latter is pressed into operative engagement with the teeth of the ratchet wheel 13 at the desired intervals of time, that is, one-minute intervals. Such action of the kick-in spring 19 on the pawl 15 causes the latter to advance the ratchet wheel one tooth pitch so as to effect a minute change of advance of the respective minute hand 8. The ratchet wheels 13—14 are normally under restraining control of a spring detent 20 and it is desirable to normally clear the pawl 15 from the wheel-holding detent 20 except at the desired moment of wheel motivation by action of the pawl arm 18. Therefore, the pawl 15 is normally held in outer ineffective position, to clear the detent 20, by means of a light spring 21 attached to the arm 18, or a part thereof, and so engaging the pawl 15 that its nose end is held clear of the wheels and of the detent during all of the orbital movement of the pawl except when this is in operative engagement with the kick-in spring 19.

While the pawl 15 actuates the larger ratchet wheel 13 in steps, one per minute, the pawl 15 also serves at predetermined periods to actuate the smaller ratchet wheel 14 which is co-relative with the hour hand 11. Such effective co-relation of the pawl 15 is attained when the pawl is opposite to one of the deeper tooth notches 13a in the minute ratchet wheel 13, the deeper stroke of the pawl 15 bringing it into mesh with the contiguous ratchet tooth of the wheel 14.

While any ratio of coordinate action of the pawl on the two wheels 13—14 may be employed, in the present case the hour ratchet wheel is engaged but once along its successive teeth, when the pawl 15 enters every twelfth tooth of the minute ratchet wheel 13; this timing relation effecting a complete turn of the hour wheel 14 and its allied hour hand 11 once in each twelve-hour period.

The same system of timing ratchet wheels 13 and 14 is motivated by a somewhat different type of actuating means in the apparatus shown in Figs. 4 and 5, in which case the wheels are operative by a pawl 15a carried by an armature 25 of an electromagnet 26 which may be energized by timed impulses, say one minute apart, from a master clock so that the pawl 15a will actuate the wheel 13 step by step per minute and will actuate the companion wheel 14 in steps of twelve minutes apart to effect the desired hour indication.

Instead of using the conventional hand indicators 5, 8 and 11, there is shown in Figs. 6, 7 and 8 an apparatus involving sets of indicating discs 30, 31 and 32 which may be opaque and provided with translucent or transparent index characters as 33, Fig. 6, to show the time by relative movement of the index discs across a beam of light from a source 34 in the clock case 3. If desired, the indicators may show through a magnifying lens 35, or may be projected to a ground or screen through a projector 36, Fig. 8.

If desired, various electrical circuits may be controlled by the clock mechanism, and in Fig. 1 the shaft 4 is shown as provided with a circuit-controlling disc 37 engaged by a circuit brush 38 and a similar circuit-controlling disc 39 is shown as fixed on the arbor 9.

If desired, electrical contact segments 40 may be mounted on and insulated from the several ratchet wheels to engage current collecting brushes of various electrical units which it may be desired to control by the clock. One of the contact discs is shown in detail in Fig. 10.

What is claimed is:

1. In combination, a synchronized electric clock having a shaft driven one revolution per minute, indicating means including hour and minute wheels, and means on said shaft directly engageable with and driving each of said wheels in timed co-ordination.

2. In combination, a synchronous electric clock having a shaft driven in timed sequence, time indicating means including hour and minute wheels, and means on said shaft directly engageable with and driving each of said wheels in timed coordination.

OTTO P. BAILER.